United States Patent [19]

Anderson

[11] Patent Number: 4,471,351

[45] Date of Patent: Sep. 11, 1984

[54] SWITCHABLE TANDEM MEMORY MAGNETO-OPTIC DISPLAY

[75] Inventor: Robert H. Anderson, Long Beach, Calif.

[73] Assignee: Litton Systems, Inc., Beverly Hills, Calif.

[21] Appl. No.: 375,322

[22] Filed: May 5, 1982

[51] Int. Cl.³ .............................................. G09G 3/20
[52] U.S. Cl. ................................. 340/783; 340/716; 340/795; 340/701; 350/375; 350/377
[58] Field of Search ............... 340/783, 793, 737, 716, 340/717, 705, 795, 701; 350/374, 375, 376, 377, 378, 388, 392, 407; 358/241

[56] References Cited

U.S. PATENT DOCUMENTS 4,229,072 10/1980 Torok et al. ..................... 350/375
4,309,084 1/1982 Hill ..................................... 350/377

FOREIGN PATENT DOCUMENTS

2062930 5/1981 United Kingdom ............... 340/716
614451 6/1978 U.S.S.R. ............................. 340/716

Primary Examiner—Gerald L. Brigance

[57] ABSTRACT

A magneto-optic display in which two closely spaced parallel memory chips are mounted together in a projection or direct viewing display device. Light passes through the chips in tandem, but the information on either one of the chips can be separately selected and displayed with no trace of the information on the other chip appearing in the display. An additional polarizer is placed between the two memory chips and is capable of rotating into various predetermined positions to select the desired display. The switching polarizer is electromechanically driven to provide rapid switching between displays. In another mode of operation, the images stored on both chips can be combined in a single display. This display makes it possible to view a steady unblinking image on one chip while the next updated image for viewing is being invisibly written on the other chip. It is also possible to retain both the last and next-to-last images in a sequence of images, but occasionally referring back to the previous one. Three chip embodiments are shown capable of full-color display.

16 Claims, 15 Drawing Figures

SWITCHABLE TANDEM MEMORY MAGNETO-OPTIC DISPLAY

BACKGROUND OF THE INVENTION

The present invention relates to display systems and, more particularly, to display systems in which magneto-optic chips are used to create a display through Faraday rotation of addressable areas in a beam passing through a polarizer and polarization analyzer.

Magneto-optic displays are a relatively new phenomenon as far as practical adaptations thereof. The magneto-optic chips employed therein are divided into addressible areas, typically in a rectangular pattern. Each area can individually impart Faraday rotation to a light beam passing therethrough in a clockwise or counter-clockwise direction. By placing one or more chips between a polarizer on one side and a polarization analyzer on the opposite side, a display pattern can be impressed on a beam of light passing therethrough for projection or direct viewing. The construction and operation of such chips are shown in detail in co-pending applications Ser. No. 320,819, Filed Nov. 12, 1981 by B. E. MacNeal and W. E. Ross, titled ALTERING THE SWITCHING THRESHOLD OF A MAGNETIC MATERIAL and Ser. No. 375,327, Filed on even date herewith by W. E. Ross titled METHOD AND DEVICE FOR INCREASING THE DENSITY OF A PLURALITY OF SWITCHABLE MAGNETIC ELEMENTS both assigned to the assignee of the present invention as are other display applications by the present inventor which are shown in co-pending applications Ser. No. 375,328, titled DYNAMIC MAGNETO-OPTIC SPATIAL FILTERING SYSTEMS, Ser. No. 375,324, titled DIFFUSION-LIGHTED MAGNETO-OPTIC DISPLAY, Ser. No. 375,325, titled MAGNETO-OPTIC DISPLAY, and Ser. No. 375,329, titled IMPROVED MAGNETO-OPTIC IMAGE SCANNING DETECTOR all filed on even date herewith.

In many applications, it is desirable to be able to combine two or more display images in one display device with the ability to switch between them singly or in combination. For example, it would be desirable to be able to view a steady unblinking image on one display while the next updated image for viewing is being invisibly written on another display. This is, of course, possible with two completely individual displays wherein the source of illumination for one is blocked or turned off during such writing. In a single display device, however, such ability, particularly in the form of a memory, is particularly desirable. For example, an oscilloscope used for waveform comparison would be highly desirable if able to maintain the previous waveform which could then be referred to for comparison. When adjusting a tuning slug in an inductance, for example, a bandpass waveform is typically displayed after each adjustment. If newly generated waveforms could be placed alternatively on one display element and then the other, one could always refer back to the previous waveform for comparison. This is a feature, of course, not generally available on a typical cathode ray oscilloscope.

Oscilloscopes, additionally, must be set up for fast response or slow response waveforms. In a fast response waveform, fast phosphors are used which rapidly decay. The display is created by rapidly repeating the scanned waveform. As the moving dot moves across the screen and is deflected, it creates a pattern which is easily recognizable despite the limited persistence of illumination of the phosphors. On the other hand, in a slowly changing environment, slow phosphors with long persistence must be utilized or the overall pattern being created becomes a meaningless slow movement of a single dot across the screen. If such slow phosphors are attempted to be used in a rapid scan pattern, a meaningless jumble of phosphor glow is created. Therefore, it would also be desirable to have a display which could alternate between both modes of operation or, conceivably, combine both into a single display simultaneously.

Wherefore, it is the object of the present invention to provide a display having the aforementioned capabilities.

SUMMARY

The foregoing objectives have been met in a magneto-optic display for positioning in a beam of light comprising, in sequence, first means for polarizing light passing therethrough in a first axial orientation; first magneto-optic chip means for rotating light passing therethrough by Faraday rotation in addressible areas according to a first desired display image; adjustable means for polarizing light passing therethrough in a variable axial orientation; second magneto-optic chip means for rotating light passing therethrough by Faraday rotation in addressible areas according to a second desired display image; second means for polarizing light passing therethrough in a second axial orientation; and further comprising, means operably connected to the adjustable polarization means for selectively changing the axis of polarization thereof.

DESCRIPTION OF THE VARIOUS EMBODIMENTS

Figure 1:
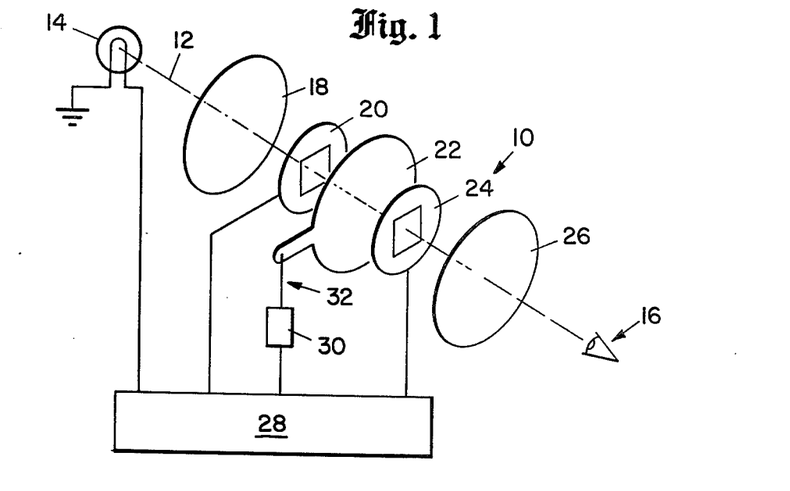
FIG. 1 is a simplified drawing of a display according to the present invention.

The present invention is shown in its simplest embodiment in the simplified drawing of FIG. 1. The system, generally indicated as 10, is placed in a light beam 12 between a light source 14 and a viewer 16. System 10 could, of course, be used to project the display by placing a projection focusing lens in place of the viewer 16. Likewise, the display according to the present invention can be incorporated in a front-lighted viewing display as described in my co-pending application Ser. No. 375,323, filed on even date herewith and titled FRONT-LIGHTED MAGNETO-OPTIC DISPLAY which is also assigned to the assignee of this invention.

The system comprises, in sequence, a polarizer 18, a first magneto-optic chip 20, a second polarizer 22, a second magneto-optic chip 24, and a polarization analyzer 26. The polarization analyzer 26 is, of course, also a polarizer sheet. The first polarizer 18 polarizes the light beam 12 along a first axial orientation. The first magneto-optic chip is connected to a display driver 28 which causes addressible areas within the first magneto-optic chip 20 to impart Faraday rotation clockwise or counter-clockwise to the polarized light beam 12 from the first polarizer 18 according to a first desired display image. Light by areas as modified by the first magneto-optic chip 20 passes through or is attentuated by the second polarizer 22. Further axial rotation by areas is imparted to any portion of the light beam 12 reaching the second magneto-optic chip 24 according to a second desired display image. The second magneto-optic chip 24 is also connected to the display driver 28. Finally, the polarization analyzer 26 passes or blocks the areas of rotation according to their axial alignment with the polarization axis of the polarization analyzer 26. In addition to the second polarizer 22 being placed between the first magneto-optic chip 20 and the second magneto-optic chip 24, however, the second polarizer 22 is mounted for rotation about the optical axis of the light beam 12. By such rotation, the polarization axis of the second polarizer 22 can be placed into selectible orientation vis-a-vis the polarization axes of the first polarizer 18 and the polarization analyzer 26. In the preferred embodiment, such rotation is accomplished by a solenoid 30 operably connected to the second polarizer 22 by linkage 32 and driven by the display driver 28. The solenoid 30 could also be replaced by a stepping motor or other electro-mechanical means any of which can rotate the second polarizer to different positions in a switching time shorter than a human observer can perceive. In its simplest form, of course, the second polarization analyzer 26 could be rotated by hand to effect the desired results.

System 10 provides four single-display modes resulting in display of either of the two chips 20, 24 in either of two polarities; that is, light characters on a darker background or darker characters on a light background displayed from either chip. There are also four operating conditions giving combined displays in which the characters of one chip are either light or dark while the characters of the other chip can, at the same time, be displayed either light or dark.

The obtainable effects and their manner of attainment using the present invention can best be understood from the following description of actual tests conducted by the applicant herein.

In the first test, the first polarizer 18 was arbitrarily oriented with its axis vertical or 0°, and the second or switching polarizer 22 had its axis about 75° clockwise from vertical, as viewed when looking towards the source 14 along the optic axis. The two chips were of a type which operates within its optimum display range when it is placed between polarizers which have their axes crossed at 75°. Therefore, the light leaving the switching polarizer 22 was in good condition for forming a direct-viewing or projection display of the display on chip 1 (i.e., first magneto-optic chip 20). However, to display only chip 1, the display of chip 2 (i.e., second magneto-optic chip 24), must be avoided.

The direction of polarization of light leaving chip 1 is a complex mixture of different directions for different colors, and is also divergent for the "on" and "off" conditions of the post. A chip having about 10° of Faraday rotation for the "on" posts, and 10° of counter-clockwise rotation for the "off" posts has a nominal spread of 20° between polarization axes for white light; but, this consists of an actual spread of about 8° at the red end of the spectrum and about 64° at the blue end. This complexity, however, does not appear in the light leaving the switching polarizer 22, which is all in one plane of polarization, since the switching polarizer 22 shorts out the transverse components of the electric vector of the incident radiation, transmitting only the components parallel to its axis of polarization. This is the essential principle of operation of the present invention, since what is necessary to "wash-out" the display of chip 2 is that the axis of polarization analyzer 26 be oriented the same as the switching polarizer axis, at 75°. This would not be obvious even to those familiar with polarizers, since devices having three polarizers are uncommon in the art, and it is not usually necessary to consider the condition of the light leaving a second polarizer.

Similarly, the switching polarizer 22 need only be rotated to an orientation of 0°, matching the input polarizer 18, to pass a featureless bright area of light through chip 1 and to place chip 2 between polarizers crossed at 75°, for display of chip 2. Since 75° is also in the optimum range for chip 2, rotation of the switching polarizer 22 from 75° to 0° can be accomplished to switch the projected image from an optimum display of chip 1 to an optimum display of chip 2. Accordingly, in initial experiments, the relative position of the three polarizers 18, 22, and 26 for displaying chip 1 was: 0°, 75°, and 75°, respectively, and for displaying chip 2, the polarizers were at 0°, 0°, and 75° (with all angles clockwise looking toward the source 14).

Figure 10:
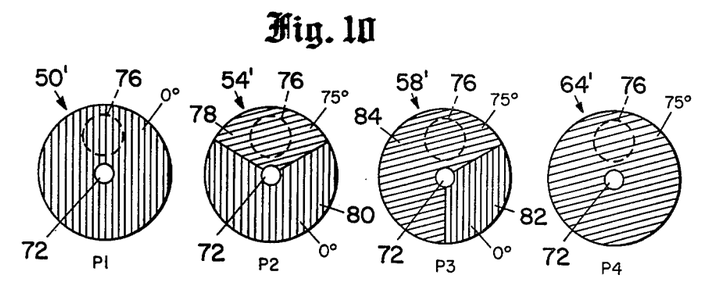
FIG. 10 shows the configuration of the disks of FIG. 9.

Four chips were employed in the tests with the system of FIG. 10 ranging in their Faraday rotation from about 3° to 8°. The optimum analyzer settings for projecting these chips is not highly critical, however, and does not vary greatly from chip to chip. The optimum ranges of analyzer positions for the various chips were: 70°-84°, 66°-80°, 62°-79°, and 68°-80°. The white light Faraday rotations were respectively: 6°, 8°, 5°, and 3°. In the experiments just described, the polarization analyzer axis could be set anywhere from 68° to 79° and still be within the optimum viewing range of all four of the chips which have been fully tested so far. This indicates that an analyzer setting of 73° and a switching polarizer axis position switched between 0° and 73° would give optimum-ranged display for any possible combination of two chips selected from this group of four.

Where it is desired to use two very dissimilar chips, the best displays can be achieved by a switching rotation of more than one polarizer. Suppose that with a vertically oriented input polarizer, some imaginary odd chip to be used for chip 1 gave good results only with a second polarizer positioned from 54° to 70°, but some odd chip 2 only worked well between polarizers differing by from 70° to 85°. The relative positions of three polarizers for displaying chip 1 would be 0°,62°, and 62°, respectively, and for displaying chip 2 they would be positioned at 0°, 0° and 80°, respectively, requiring that both the switching polarizer and the analyzer be moved to effect display switching. Of course, any two polarizers (or all three for that matter) can be moved to obtain the same relative positions. More complex systems will be discussed hereinafter.

A next consideration with respect to the capabilities of the present invention is the providing of a display in which one chip, say chip 1, can be displayed with either light characters on a dark background or dark characters on a light background, but is only required to display chip 2 in one of these modes. Since chip 1 requires an analyzer at either 75°, or 105°, respectively, when projected alone, and chip 2 requires a difference of 75° across it, the following polarizer positions were required for a three-mode display in these first experiments:

0°, 105°, 105°, displays chip 1, light on dark.
0°, 75°, 75°, displays chip 1, dark on dark.
0°, 0°, 75°, displays chip 2, dark on light.

It follows from the above that one more available combination of polarizer angles, that is, 0°, 0°, 105° adds the capability of displaying chip 2, light on dark, and this was verified experimentally, giving a four-mode display. This does, however, require moving two polarizers, one of them moving to three selected positions and the other moving between two positions.

It was also found that under poor conditions of brightness or contrast, such as might occur in outdoor use, a shortcut can be taken, in which a proper crossing angle is provided for the display chips, but the washed-out chips provided with polarizers which depart somewhat from 0° relative angles. This somewhat simplifies polarizer switching requirements, but, on the other hand, would probably only be used where there is a great need for simplification, since the undesired display is sometimes marginally visible as a background "ghost" unless very critical adjustments are made. This arrangement is mentioned only for completeness. Only one polarizer needs to be moved in this method, and four positions are required as follows:

0°, 101°, 90° displays chip 1, light on dark.
0°, 78°, 90° displays chip 1, dark on light.
0°, 11°, 90° displays chip 2, dark on light.
0°, 349°, 90° displays chip 2, light on dark.

Further display capability can be obtained by providing for correctly crossed polarizers for both chips at the same time, so that a combined display can be formed. In Table I, the polarizer angles for combined displays are shown, together with previously discussed angles for single-chip displays. The difference in angles of cross polarizers for each chip (Δ1 and Δ2) are also shown, for convenient reference:

TABLE I

| IP | Δ1 | SP | Δ2 | PA | DISPLAY |
|---|---|---|---|---|---|
| 0° | 105° | 105° | 0° | 105° | Chip 1, light on dark |
| 0° | 75° | 75° | 0° | 75° | Chip 1, dark on light |

TABLE I-continued

| IP | Δ1 | SP | Δ2 | PA | DISPLAY |
|---|---|---|---|---|---|
| 0° | 0° | 0° | 75° | 75° | Chip 2, dark on light |
| 0° | 0° | 0° | 105° | 105° | Chip 2, light on dark |
| 0° | 75° | 75° | 75° | 150° | Both chips dark on light |
| 0° | 105° | 105° | 105° | 210° | Both chips light on dark |
| 0° | 75° | 75° | 105° | 180° | #1 dark on light; #2 light on dark |
| 0° | 105° | 105° | 75° | 180° | #1 light on dark; #2 dark on light |

It will be appreciated that when either chip is operated with light characters on a full-area dark background, the other chip receives only the background level of light to modulate for its display, in a typical situation having no character overlap. An improvement in the display will result from decreasing the relative angles (Δ1, Δ2 or both) across the chip(s) having a dark background display shifting towards the high-brightness end of the optimum range. This is particularly desirable where both chips are operated light-on-dark.

Figure 2:
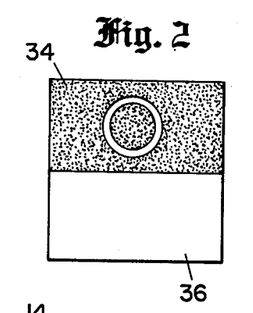
FIGS. 2–4 show a typical display in its individual forms in FIGS. 2 and 3 and as combined in FIG. 4, respectively.
Figure 3:
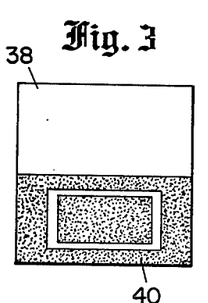
Figure 4:
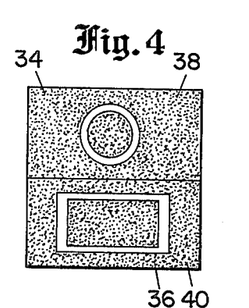

Another way to operate both chips light-on-dark is to store a light featureless patch on one part of each chip, corresponding to the image area on the other display chip, as shown in FIGS. 2–4. One chip is as shown in FIG. 2 with its display 34 in the upper one-half and the bottom one-half 36 being a clear area. The second chip, shown in FIG. 3, has a clear area 38 corresponding to area 34 of the first chip and a display area 40 corresponding to the clear area 36 of the first chip in FIG. 2. When combined as shown in FIG. 4, display 34 combines with clear area 38 so that display 34 is clearly visible by the light being transmitted through clear area 38 and, correspondingly, clear area 36 passes the light for display area 40 so that it is clearly visible.

In my initial experiments, each chip was mounted between cover glass plates and about a ⅛ inch gap was left between the mounted chip assemblies for insertion of a hand-held paddle consisting of the switching polarizer mounted on glass. This arrangement resulted in considerable space between chips. Both chips could not be placed within the depth of focus of the projection lens at the same time, and a poorly focused display resulted. Naturally, improved focus will result from placing the chips close together, with their posts facing each other, with just enough clearance to allow rotation of the switching polarizer, also keeping enough separation to prevent the switching current from writing the wrong chip. Further improvement in resolution will result from the use of aperture stops to increase the depth of focus of the system by reducing the numerical aperture, or by using small diameter source of illumination. The use of a fixed central polarizer would permit the chips to be placed in contact with the central polarizer, or laminated to it for a further reduction of the space between chips. The proper position for the polarizers can be found by adding a constant rotation angle to all three positions for any previously determined display, so that the central polarizer remains fixed. For example, the Table I polarizer angles, converted for a fixed central polarizer, are as shown in Table II:

TABLE II

| IP | Δ1 | SP | Δ2 | PA | DISPLAY |
|---|---|---|---|---|---|
| 75° | 105° | 0° | 0° | 0° | Chip 1, light on dark |
| 105° | 75° | 0° | 0° | 0° | Chip 1, dark on light |
| 0° | 0° | 0° | 75° | 75° | Chip 2, dark on light |
| 0° | 0° | 0° | 105° | 105° | Chip 2, light on dark |
| 105° | 75° | 0° | 75° | 75° | Both chips dark on light |

TABLE II-continued

Figure 5:
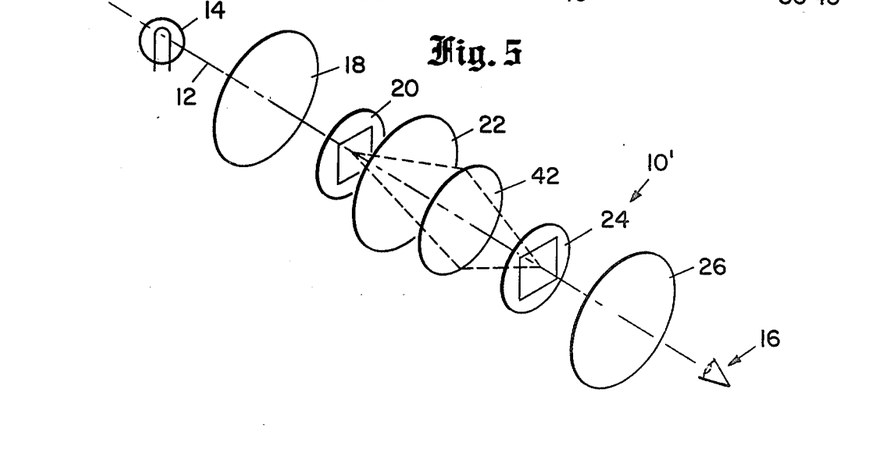
FIG. 5 shows the present invention in an alternate embodiment wherein a focusing lens is incorporated therein.

| IP | Δ1 | SP | Δ2 | PA | DISPLAY |
|---|---|---|---|---|---|
| 75° | 105° | 0° | 105° | 105° | Both chips light on dark |
| 105° | 75° | 0° | 105° | 105° | #1 dark on light; #2 light on dark |
| 75° | 105° | 0° | 75° | 75° | #1 light on dark; #2 dark on light |

Where even more resolution is desired, chip 1 can be imaged on chip 2 by the insertion of a relay lens 42 as in the modified system 10' of FIG. 5. In the system 10' of FIG. 5, chip 2 and the relayed image of chip 1 provided by lens 42 can be viewed directly or projected on a screen together with no loss of resolution due to any separation between the chips. This configuration has the advantage that there is room for additional components between the chips, as will be described later.

Figure 6:
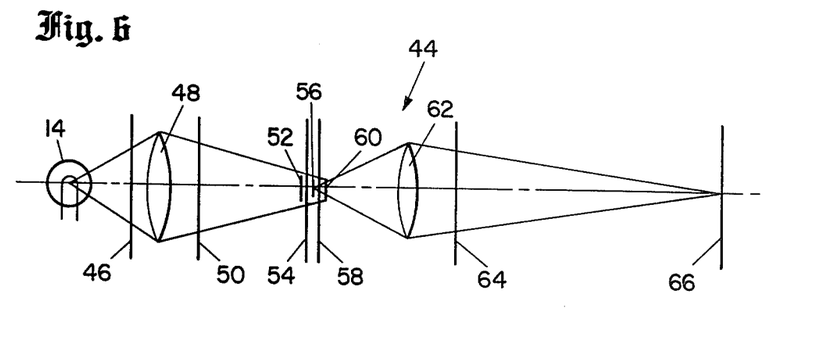
FIG. 6 shows a three chip system of the present invention in a first embodiment.
Figure 7:
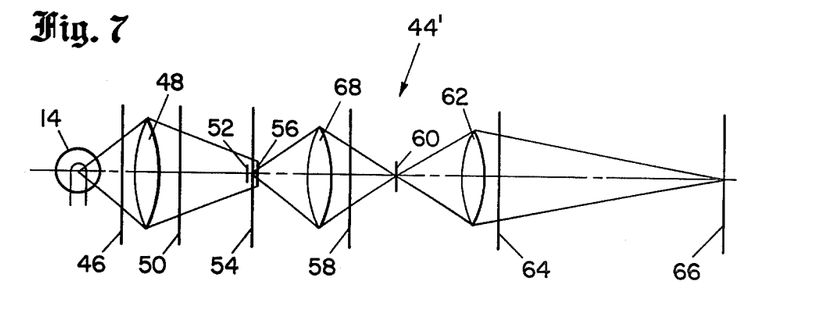
FIG. 7 shows a three chip system of the present invention in a second embodiment employing one relay lens.
Figure 8:
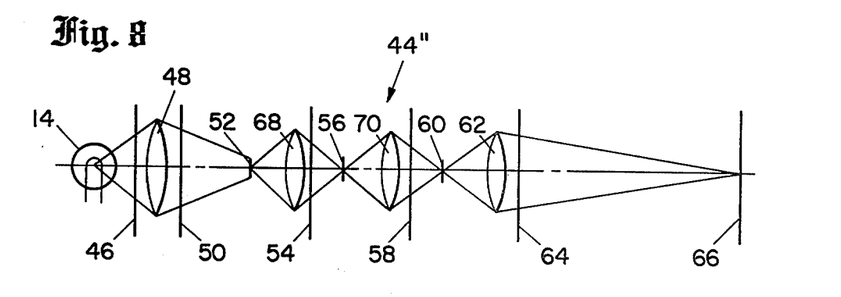
FIG. 8 shows a three chip system of the present invention in a third embodiment employing two relay lenses.

The use of relay lenses, as in the embodiment of FIG. 5 just described, makes it possible to use three or more chips in a multi-mode display, as shown in FIGS. 6–8. In FIG. 6, a display device, generally indicated as 44, is shown in which there is sufficient depth of focus to place three chips and two movable intermediate switching polarizers within the depth of focus. The elements of system 44 are, in sequence, light source 14, heat filter 46, lens 48, a fixed image polarizer 50, a first chip 52, a first switching polarizer 54, a second chip 56, a second switching polarizier 58, a third chip 60, a projection lens 62, and a polarization analyzer 64 which results in the image being focused on the viewing surface 66. The system 44 of FIG. 6 assumes that the chips 52, 56, 60 are in sufficiently close proximity that by focusing lens 62 on the central chip 56, the two remaining chips 52, 60 will be within sufficient focal range to be acceptably focused by lens 62.

In the revised system 44' of FIG. 7, a first relay lens 68 is disposed between the second chip 56 and the second switching polarizer 58 to focus the combined chips 52, 56 onto the third chip 60. This is a compromise situation in which it is assumed that by focusing the relay lens 68 upon the first switching polarizer 54 both chips will be acceptably within focal range.

Yet a second variation, designated as 44'' is shown in the three-chip system of FIG. 8. In this configuration, the first relay lens 68 is positioned between the first chip 52 and the second chip 56 for precise focusing of the first chip 52 upon the second chip 56 and a second relay lens 70 is positioned to focus the second chip 56 upon the third chip 60.

Figure 9:
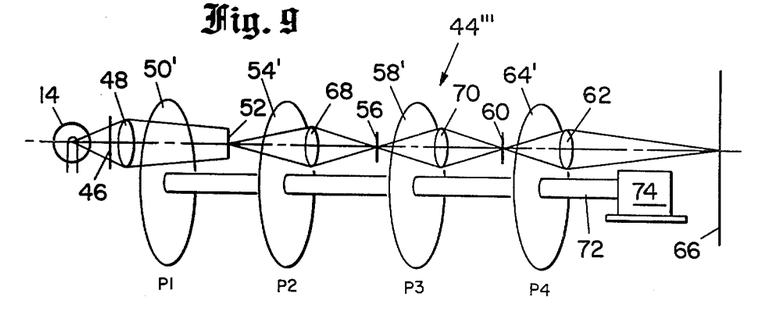
FIG. 9 shows the system of FIG. 8 with all the polarizers configured as disks mounted on a common shaft and driven in tandem by a motor.

When a Faraday-rotation chip is disposed between two polarizers, the display is not affected if both polarizers are rotated together with a constant difference between their axis angles. This makes it possible to switch rapidly between three (or more) chips by mechanically rotating divided-area polarizers on a common shaft as shown in FIG. 9. The system 44''' of FIG. 9 corresponds functionally to the system 44'' of FIG. 9 except that the four polarizers labelled P1-P4 in FIG. 9 are all mounted upon shaft 72 for common rotation by motor 74. The construction of the disks comprising the image polarizer 50', the first switching polarizer 54', the second switching polarizer 58', and the projection analyzer 64' are shown in FIG. 10. The dotted circles 76 in the disks 50', 54', 58' and 64' of FIG. 10 represent the region of each disk through which light initially passes. Disks P2 and P3 (the first and second switching polarizers 54' and 58' and 64', respectively) have two different sectors with two different directions of polarization. On disk P2, these are designated as 78 and 80, respectively. On disk P3, they are designated as 82 and 84. The cross-hatching lines show the direction of polarization, which is either 0° or 75° relative to 0° at vertical, with angles read clockwise looking towards the source of light 14. If the common shaft 72 carrying the four polarizer disks is rotated clockwise by 120°, the light then passes through the lower left side of each disk as FIG. 10 is viewed. The direction of polarization of the disk, relative to the polarization axis of disk P1, is unchanged for all disks except P2, which switches from 75° to 0° orientation. If the shaft 72 is rotated clockwise another 120°, the light passes through the lower right side of the disks of FIG. 10 as it is viewed and this causes disk P3 to switch from 75° to 0° orientation. As the shaft 72 is rotated in 120° steps by a stepping motor or similar means as motor 74, one chip at a time has crossed polarizers around it, while the other chips have parallel polarizers around them. This displays the chips in sequence as shown by Table III of relative angles.

TABLE III

| P1 | P2 | P3 | P4 | |
|---|---|---|---|---|
| 0° | 75° | 75° | 75° | Displays chip C1 |
| 0° | 0° | 75° | 75° | Displays chip C2 |
| 0° | 0° | 0° | 75° | Displays chip C3 |

Any of the above displays may consist of either dark or light images on the opposite type of background, depending on the orientation of each chip and its direction of magnetization.

Figure 11:
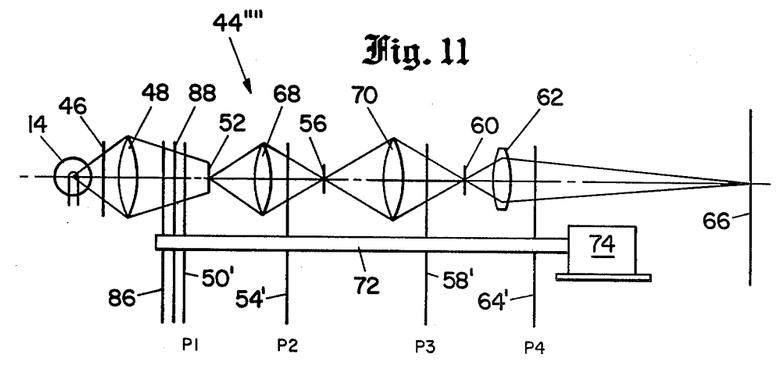
FIG. 11 shows the system of FIG. 10 further modified to display full-color displays.
Figure 12:
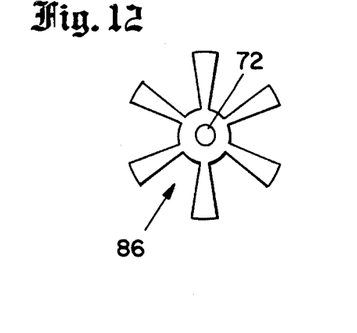
FIG. 12 shows the configuration of the light chopping disk used in the system of FIG. 11.
Figure 13:
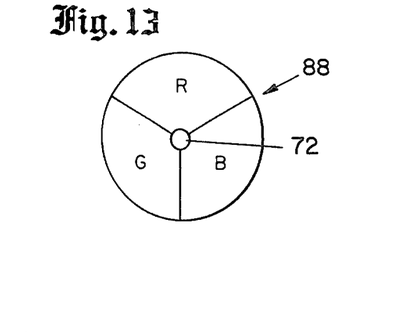
FIG. 13 shows the configuration of the color wheel disk of the system of FIG. 11.

Instead of rotating the shaft 72 and polarizers P1-P4 in steps, they may be rotated continuously, together with a sector-partitioned color filter wheel, to form a three-color display device, as shown in FIG. 11. In this system, designated as 44'''', the parts are the same as in the system 44''' of FIG. 9, except for the addition of the (optional) light chopper 86 as shown in detail in FIG. 12 and the color filter wheel 88 shown in detail in FIG. 13. For constant rotation, it is also more practical to have motor 74 be a continuously rotating motor. The full-color projection device 44'''' of FIG. 11 differs in important ways from a conventional field-sequential color television, because of the storage capability of the chips. It is not necessary that the red signal be present at the time that the red display is viewed, since the most current red signal can always be present on the red signal chip, and available for viewing. Where video information is displayed, it may derived from dot sequential, line sequential, or field sequential systems, or may be written in serial access or random access form, since the storage capability of the chip permits the form of the input signal to differ from the form of the field sequential output display. The light chopper 88 can be used, where needed or desired, to increase the flicker frequency above the flicker fusion point of human observers. It may also be incorporated as an integral part of the color wheel filter 88 or one of the polarizing disks, in addition to being a stand-alone element as shown.

Figure 14:
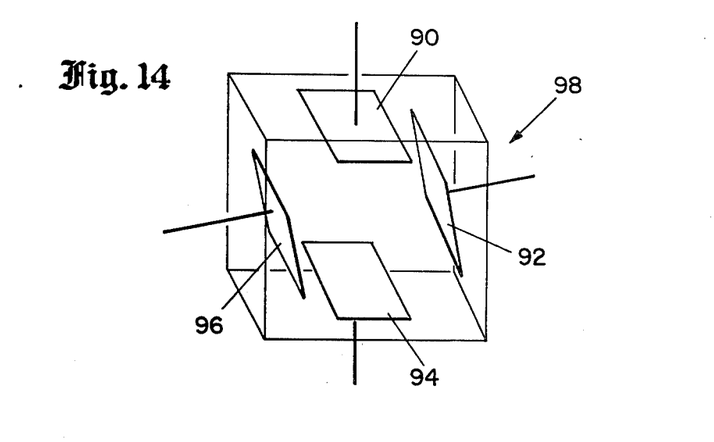
FIG. 14 is a simplified perspective view of a Kerr cell in transparency.
Figure 15:
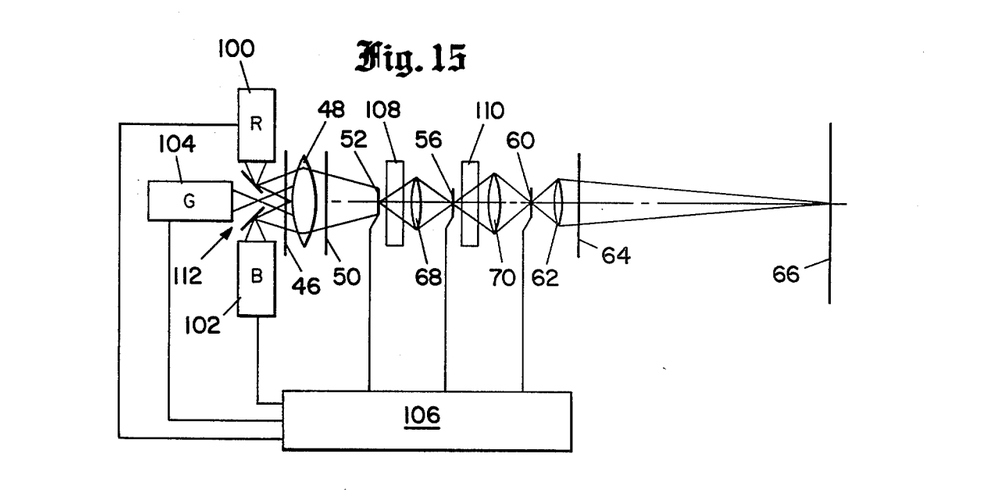
FIG. 15 is an all electrical full color display system according to the present invention.

When it is desired to use a field frequency higher than can readily be achieved with rotating mechanical components, Kerr cells or Pockels cells may be used in place of polarizing sheets. This is shown in FIG. 14, where an arrangement of electrodes 90, 92, 94 and 96 are depicted for alternately creating polarization axes at 75° from each other in a Kerr cell generally indicated as 98. Only two cells are needed for a three-color display, since the two outer polarizers are fixed, and sheet polarizers may be used in those positions. The overall arrangement for a full-color display to substitute for the mechanical display of FIG. 11 is shown in FIG. 15. The single light source 14, chopper 86 and color filter wheel disk 88 of the mechanical system of FIG. 11 are replaced by red, green, and blue light sources 100, 102, 104, respectively. The light sources 100, 102, 104 are connected to and controlled by the control circuit 106 which is also connected to and provides the display image information to the three chips 52, 56, and 60. A first Kerr cell 108 is disposed between the first chip 52 and the second chip 56. A second Kerr cell 110 is disposed between the second chip 56 and the third chip 60. Both Kerr cells 108, 110 are connected to the control circuit 106 to be driven thereby in synchronization with the chips 52, 56, 60 and the light sources 100, 102, and 104. Mirrors 112 are disposed as necessary to focus the light from the three light sources 100, 102, 104, through the heat filter 46 and into the collimating lens 48. Thereafter, the system 114 is controlled by the logic contained within control circuit 106 to operate in the same manner as the mechanical circuit of FIG. 11.

Many variations of the tandem chip configuration previously described are possible. If one chip is larger than the other, part of the display can have the above-described tandem chip capability, and an adjacent additional area of one-chip capability results from the overhanging portion of the larger chip. The two chips do not both have to be chips of the magneto-optic chip type described in the above-referenced patent applications. One or both chips can be the previously known serially addressed magnetic bubble chips. Two or more tandem display chips can be combined with a film transparency on the same optic axis for a combined display. A tandem-chip display can be projected onto a map or other semi-permanent graphic display. A tandem-chip display, and a projection CRT display, a microfilm display and/or a conventional projection display can be projected together on a common screen which may be in a front or rear projection screen system, or in a system using both front and rear projection at the same time. The size of the posts on two tandem chips can be different, to favor different display types. A relay lens between two tandem chips can place a magnified or demagnified image of one chip on the other, providing a display in which the multi-mode tandem chip capability appears as an inserted smaller area within a larger single chip display, and the inserted area can be optically moved where wanted. The tandem-chip configuration, can be used like the single chip as a component in combination with photography, facsimile, electrophotography, and television equipment.

Wherefore, having thus described my invention, I claim:

1. A magneto-optic display for positioning in a beam of light comprising, in sequence:
    (a) first means for polarizing light passing therethrough in a first axial orientation;
    (b) first magneto-optic chip means for rotating light passing therethrough by Faraday rotation in addressable areas according to a first desired display image;
    (c) first adjustable means for polarizing light passing therethrough in a variable axial orientation;
    (d) second magneto-optic chip means for rotating light passing therethrough by Faraday rotation in addressable areas according to a second desired display image;
    (e) second means for polarizing light passing therethrough in a second axial orientation; and further comprising,
    (f) means operably connected to said first adjustable polarization means for selectively changing the axis of polarization thereof.

2. The magneto-optic display of claim 1 and additionally comprising:
    a relay lens disposed between said first and second magneto-optic chips for focusing the image in the plane of said first magneto-optic chip on said second magneto-optic chip.

3. The magneto-optic display of claim 1 and additionally comprising, in sequence, following said second magneto-optic chip:
    (a) second adjustable means for polarizing light passing therethrough in a variable axial orientation;
    (b) third magneto-optic chip means for rotating light passing therethrough by Faraday rotation in addressable areas according to a third desired display image; and further comprising,
    (c) means operably connected to said second adjustable polarization means for selectively changing the axis of polarization thereof.

4. The magneto-optic display of claim 3 and additionally comprising:
    a first relay lens disposed between said first and second magneto-optic chips for focusing the image in the plane of said first magneto-optic chip on said second magneto-optic chip.

5. The magneto-optic display of claim 3 or claim 4 and additionally comprising:
    a second relay lens disposed between said second and third magneto-optic chips for focusing the image in the plane of said second magneto-optic chip on said third magneto-optic chip.

6. The magneto-optic display of claim 3 wherein:
    said means for selectively changing said first and second polarization means is a common means adapted to change said first and second polarization means simultaneously.

7. The magneto-optic display of claim 6 wherein:
    said first and second polarization means and said first and second adjustable polarization means have their polarization axes oriented such that said first and second adjustable polarization means are movable between a first position where only the display of said first magneto-optic chip is viewable, a second position where only the display of said second magneto-optic chip is viewable, and a third position where only the display of said third magneto-optic chip is viewable.

8. The magneto-optic display of claim 7 wherein:
    said first and second polarization means and said first and second adjustable polarization means comprise discs rotatable on a common shaft wherein said discs for said first and second polarization means have a common polarization axis throughout and said discs for said first and second adjustable polarization means are comprised of segments having different polarization axes.

9. The magneto-optic display of claim 7 and additionally comprising:
    means for sequentially moving said first and second adjustable polarization means between said first, second, and third positions.

10. The magneto-optic display of claim 9 and additionally comprising:
full-color means operably connected to said common shaft and disposed prior to said first magneto-optic chip means; said full-color means limiting light passing to said chip means to a first primary color during said first position, to a second primary color during said second position, and to a third primary color in said third position so that a full-color display is viewable.

11. The magneto-optic display of claim 10 wherein:
said first and second polarization means, said first and second adjustable polarization means, and said light limiting means comprise discs rotating on a common driven shaft.

12. The magneto-optic display of claim 10 wherein:
(a) said light limiting means comprises three selectable light sources producing the three primary colors, respectively;
(b) said first and second adjustable polarization means comprise solid state adjustable polarizers; and further comprising,
(c) control circuit means operably connected to drive said light sources and said solid state adjustable polarizers.

13. The magneto-optic display of claim 10 in which said full-color means is a primary color filter disc having an equal sector area for each of said first, second, and third primary colors.

14. The magneto-optic display of claim 13 in which said full-color means includes a light chopper means to increase flicker frequency above the flicker fusion point of a human viewer of the full-color display.

15. The magneto-optic display of claim 3 and additionally comprising:
(a) in sequence, preceding said first means,
(1) a light source,
(2) a heat filter, and
(3) a focus lens disposed between said heat filter and said first means for focusing said light source on said first means; and
(b) in sequence, following said third magneto-optic chip means,
(1) a projection lens disposed between said third magneto-optic chip means and said second means, and
(2) a viewing surface spaced-apart from said second means and adapted to display an image focused by said projection lens thereon.

16. The magneto-optic display of claim 15 in which said first, second and third magneto-optic chip means are positioned within the focal range of said focus lens.

* * * * *